(12) United States Patent
Agami et al.

(10) Patent No.: US 6,879,623 B2
(45) Date of Patent: Apr. 12, 2005

(54) METHOD AND APPARATUS FOR TIMING RECOVERY IN A COMMUNICATION DEVICE

(75) Inventors: Gregory Agami, Arlington Heights, IL (US); Robert John Corke, Glen Ellyn, IL (US); Ron Rotstein, Arlington Heights, IL (US); Daniel G. Prysby, Elk Grove Village, IL (US)

(73) Assignee: Motorola, Inc., Schaumburg, IL (US)

(*) Notice: Subject to any disclaimer, the term of this patent is extended or adjusted under 35 U.S.C. 154(b) by 831 days.

(21) Appl. No.: 09/819,398

(22) Filed: Mar. 28, 2001

(65) Prior Publication Data

US 2002/0141482 A1 Oct. 3, 2002

(51) Int. Cl.[7] .............................................. H04L 27/30
(52) U.S. Cl. ...................... 375/140; 375/142; 375/150; 375/261; 375/327; 375/371; 370/342; 370/441; 370/479; 370/516
(58) Field of Search ................................. 375/140, 142, 375/150, 152, 261, 327, 371; 370/335, 342, 441, 479, 516

(56) References Cited

U.S. PATENT DOCUMENTS

| | | | |
|---|---|---|---|
| 4,989,221 A | | 1/1991 | Qureshi et al. ................. 375/8 |
| 5,309,482 A | * | 5/1994 | Wright et al. ................ 375/350 |
| 5,724,396 A | * | 3/1998 | Claydon et al. ............. 375/355 |
| 6,055,284 A | | 4/2000 | Kweon ........................ 375/355 |
| 6,744,835 B1 | * | 6/2004 | Panicker et al. ............. 375/355 |

OTHER PUBLICATIONS

R.A. Iltis and S.H. Goldberg; "A DS Spread Spectrum RAKE Receiver with Narrowband Interference Rejection Capability: Operation in Fading Channels"; IEEE, pp. 0704–0708, 1989.

* cited by examiner

*Primary Examiner*—Dac V. Ha
(74) *Attorney, Agent, or Firm*—Steven A. May

(57) ABSTRACT

A receiving communication device synchronizes to a timing reference of a transmitting communication device based on a determined timing error. The receiving communication device determines the timing error by processing a synchronization signal via a first stage filtering and interpolation process that includes predetermined coefficients and a second stage interpolation process that includes a minimal number of dynamically determined coefficients. By dividing the process into a predetermined coefficient stage and a dynamically determined coefficient stage, the receiving communication device is able to make timing adjustments in a more efficient manner, that is, at a lesser processor loading, than a communication device in which all filtering and interpolation coefficients are dynamically determined. In addition, by including a second order timing recovery loop, the receiving communication device is able to quickly and precisely respond to drifting of a timing reference differential between itself and the transmitting communication device.

25 Claims, 5 Drawing Sheets

METHOD AND APPARATUS FOR TIMING RECOVERY IN A COMMUNICATION DEVICE

FIELD OF THE INVENTION

This invention relates to wireless communication systems, and in particular to the recovery of timing in a wireless communication system.

BACKGROUND OF THE INVENTION

In a typical digital wireless communication system, a transmitter in a transmitting communication device receives an input of digital information, such as a bit stream, from a data source. The bit stream is provided to a symbol mapper that groups the bit stream into groups of multiple bits and maps each group of multiple bits to a corresponding symbol to produce a symbol stream. To this end, a signal constellation that includes M possible symbols is defined within a multi-dimensional space, preferably a complex two-dimensional (I,Q) space. Each symbol comprises a point within the two-dimensional space, which point may be thought of as a vector sum of two scaled basis vectors. In order to achieve the desired mapping, the symbol mapper assembles the bits into groups of multiple bits. Each group of multiple bits is then used to select a symbol out of the M possible symbols. Many modulation schemes exist for mapping each bit group to a symbol, including multiple phase shift keying (MPSK) modulation schemes, such as BPSK or QPSK, and multiple quadrature amplitude modulation (MQAM) schemes, such as 16-QAM and 64-QAM. The transmitter converts the symbols to analog signals, modulates the analog signals onto a carrier, and transmits the analog carrier.

A receiver in a receiving communication device receives the transmitted signal, demodulates the received signal, and samples the demodulated signal in order to reproduce the transmitted symbols. Ideally, each sampled symbol should map to one of the M defined symbols in the modulation scheme. However, many intervening factors can cause the samples to map to points in the complex two-dimensional (I,Q) space other than the points corresponding to the M defined symbols. One such factor is system timing errors. A difference between a clock frequency of a transmitter and a clock frequency of a receiver can cause a constant drift in a time reference of the receiver with respect to the transmitter. In addition, phase jitter in the received signal also contributes to timing errors with respect to the received signal. A result of the time reference differential and the phase jitter is a sampling of the received signal at a point other than the optimal sampling point. When the received signal is sampled at other than the optimal point, the received signal may be mapped to a point that is offset from the points corresponding to the M defined symbols. Results of sub-optimal sampling include data translation errors and degradation in the signal-to-noise ratio (SNR) of the receiver.

In order to address the problem of timing errors, timing recovery circuits have been proposed. One such circuit is proposed in U.S. Pat. No. 6,055,284, "Symbol timing Recovery Circuit in Digital Demodulator"(hereinafter referred to as the "'284" patent). The '284 patent proposes a timing recovery circuit that includes a signal switch, or sampling means, for sampling a received signal, an interpolator that interpolates the sampled signal in an interpolation interval, and a data filter that that filters the interpolated signal to produce strobe data. All interpolating is performed by the interpolator, which includes an "L" sample, or tap, long delay line and corresponding "L" tap coefficients. The timing recovery circuit of the '284 patent further includes a feedback loop that includes a timing error detector, a loop filter, and a controller. The controller includes a fraction extractor that outputs a fractional interval, based on a sampled signal, to a filter tap-coefficient calculator that is included in the interpolator. The filter tap-coefficient calculator then recalculates all "L" tap coefficients based on the fractional interval in order to adjust and synchronize the sampling of the received signal in the next sampling period.

A drawback to the timing recovery circuit of the '284 patent is a processing load imposed by the circuit for each sampling period. All interpolation coefficients are recalculated in each sampling period, which can be a significant number of coefficients. Furthermore, a Rake receiver used in a code division multiple access (CDMA) communication system includes multiple received signal demodulators. Ideally, each demodulator is assigned to a single resolvable multipath component of a transmitted signal. Implementation of the '284 patent in a Rake receiver would require a separate interpolator for each demodulator to synchronize the signal received by that demodulator with the transmitted signal, greatly multiplying the complexity and processing load imposed upon the receiving communication device by the multiple timing recovery circuits.

In addition, second generation IS-95 systems employ data rates of less than 14.4 kilobits per second (kbps) and use low order modulation schemes such as BPSK or QPSK. Such slower data rates and low order modulation schemes tolerate lower SNR's and greater timing errors than the high data third-generation IS-95 systems, which have data rates of up to 5 megabits per second (Mbps) and require a higher order modulation schemes such as 16-QAM or 64-QAM. As a result, a typical second generation system employs a simple timing recovery circuit that tolerates timing errors of $\frac{1}{16}$ chip or more and uses a first order delay locked loop. Such a system is inadequate for a third generation system, where a timing error of just $\frac{1}{32}$ chip can lead to a SNR degradation of over 3 decibels (dB), which is intolerable for many high order modulation schemes.

Therefore, a need exists for a method and apparatus for receiving data that introduces a reduced processing load and a reduced timing error relative to current timing recovery circuits.

DETAILED DESCRIPTION OF THE INVENTION

Figure 1:
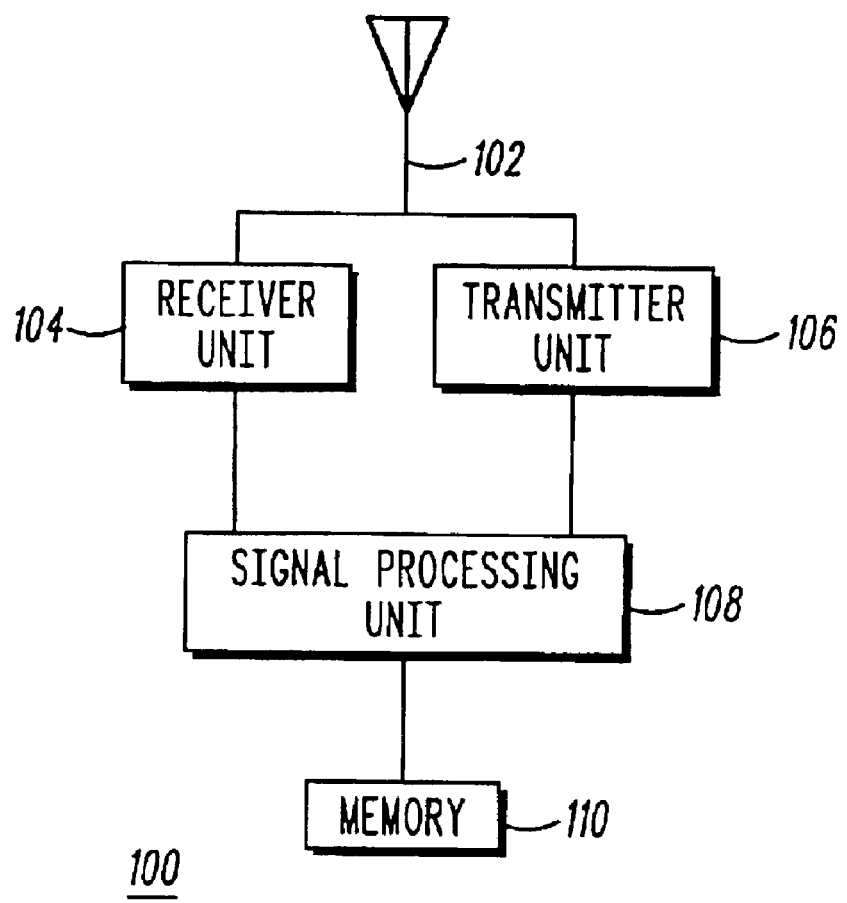
FIG. 1 is a block diagram of a communication device in accordance with an embodiment of the present invention.

In order to address the need for a method and apparatus for receiving data that introduces a reduced processing load and a reduced timing error relative to current timing recovery circuits, a receiving communication device synchronizes to a timing reference of a transmitting communication device based on a determined timing error. The receiving communication device determines the timing error by processing a synchronization signal via a first stage filtering and interpolation process that includes predetermined coefficients and a second stage interpolation process that includes a minimal number of dynamically determined coefficients. By dividing the process into a predetermined coefficient stage and a dynamically determined coefficient stage, the receiving communication device is able to make timing adjustments in a more efficient manner, that is, at a lesser processor loading, than a communication device in which all filtering and interpolation coefficients are dynamically determined. In addition, by including a second order timing recovery loop, the receiving communication device is able to quickly and precisely respond to drifting of a timing reference differential between itself and the transmitting communication device.

Briefly, in accordance with one embodiment of the present invention, an apparatus is provided for timing recovery in a communication device. The apparatus includes a first stage filter that filters and interpolates the received signal based on a plurality of predetermined coefficients to produce an interpolated signal, a sequence generator that generates at least one code sequence, and a sampler in communication with the first stage filter that samples the interpolated signal based on a sampling period to produce a plurality of sampled signals. The sampler adjusts the sampling period based on a timing error determined by a timing recovery loop. The apparatus further includes multiple second stage interpolation filters, wherein each interpolation filter of multiple second stage interpolation filters is coupled to the sampler, receives a sampled signal of the plurality of sampled signals, and interpolates the sampled signal based on at least one dynamically determined interpolation coefficient to produce a sampled and interpolated signal. The apparatus further includes multiple despreaders, wherein each despreader of the multiple despreaders is coupled to the sequence generator and to an interpolation filter of the multiple second stage interpolation filters. Each despreader receives a sampled and interpolated signal from an interpolation filter, receives the code sequence from the sequence generator, and cross-correlates the interpolant with the code sequence to produce a cross-correlated signal. The apparatus further includes a timing recovery loop coupled to the sampler and to each despreader that receives a cross-correlated signal from each despreader of the multiple despreaders and determines a timing error based on the received cross-correlated signals.

In another embodiment of the present invention, a method is provided for timing recovery. The method includes steps receiving a radio frequency signal, interpolating the received signal based on a plurality of predetermined interpolation coefficients to produce an interpolated signal, and sampling the interpolated signal based on a sampling rate to produce a plurality of sampled signals. The method further includes a step of interpolating each sampled signal of the plurality of sampled signals based on at least one dynamically determined interpolation coefficient to produce a plurality of interpolated and sampled signals. The method further includes steps of determining a timing error based on the plurality of interpolated and sampled signals and adjusting the sampling rate based on the determined timing error.

In still another embodiment of the present invention, a communication device is provided that includes a receiving unit coupled to a signal processing unit. The receiving unit is capable of receiving a spread spectrum signal, demodulating the received spread spectrum signal to produce a baseband signal, and sampling the baseband digital signal to produce a baseband digitized signal. The signal processing unit is capable of interpolating the baseband digitized signal based on a plurality of predetermined coefficients to produce an interpolated signal, sampling the interpolated signal based on a sampling period to produce a plurality of sampled signals, interpolating each sampled signal of the plurality of sampled signals based on at least one dynamically determined interpolation coefficient to produce a plurality of output signals, determining a timing error based on at least two output signals of the plurality of output signals, and adjusting the sampling period based on the determined timing error.

The present invention can be more fully understood with reference to FIGS. 1–5. FIG. 1 is a block diagram of a communication device 100 in accordance with an embodiment of the present invention. Communication device 100 includes an antenna 102 that is coupled to each of a receiver unit 104 and a transmitter unit 106. Receiver unit 104 and transmitter unit 106 are each further coupled to a signal processing unit 108, preferably a processor such as a microprocessor or a digital signal processor (DSP). Signal processing unit 108 is further coupled to a memory 110 that stores programs and instructions that are executed by the signal processing unit.

Communication device 100 is preferably a transceiver that is capable of operating as a transmitting communication device and as a receiving communication device in a radio frequency (RF) spread spectrum communication system. In a typical RF spread spectrum communication system, such as a Code Division Multiple Access (CDMA) communication system, a transmitting communication device spreads an orthogonal code (e.g., a Walsh code) covered data sequence by applying a spectrum spreading code sequence, such as a pseudo-noise (PN) sequence, to the orthogonal code covered data sequence. That is, an input data stream, preferably binary data such as a bit stream, that is sourced to the transmitting communication device is multiplied by an assigned Walsh code sequence. Each Walsh code covered data stream is subsequently summed and spread with a PN sequence.

A typical spread spectrum communication system includes multiple communication channels. Each communication channel is covered by a Walsh Code that is orthogonal to all other Walsh Codes that are transmitted in the same frequency bandwidth. Typically, the multiple communication channels include a pilot channel, multiple paging channels, and multiple traffic channels. The transmitting communication device transmits a pilot signal, paging information, or user information by covering the information with the appropriate Walsh Code and spreading the summed channels with the PN sequence. In turn, a receiving communication device receives the spectrally spread RF signal and cross-correlates the received signal with the time aligned PN sequence used to spread the signal. The PN despread sequence is subsequently uncovered by the channel assigned Walsh sequence in order to recover the original data sequence.

In a communication system that includes an invariant propagation environment, the process of encoding, transmitting, and decoding a digital signal can be somewhat straightforward. However, in a communication system with an unpredictable propagation environment such as a wireless propagation environment, multipath fading can produce multiple path, time-dispersed component signals of the transmitted signal. The multiple path component signals can cause an undesired disturbance in the received signal. To combat the problem of multipath fading, a receiver unit such as receiver unit 104 in communication device 100 combines the energy from each of the multiple path component signals in order to use as much signal energy as possible in recovering the transmitted data sequence.

Figure 2:
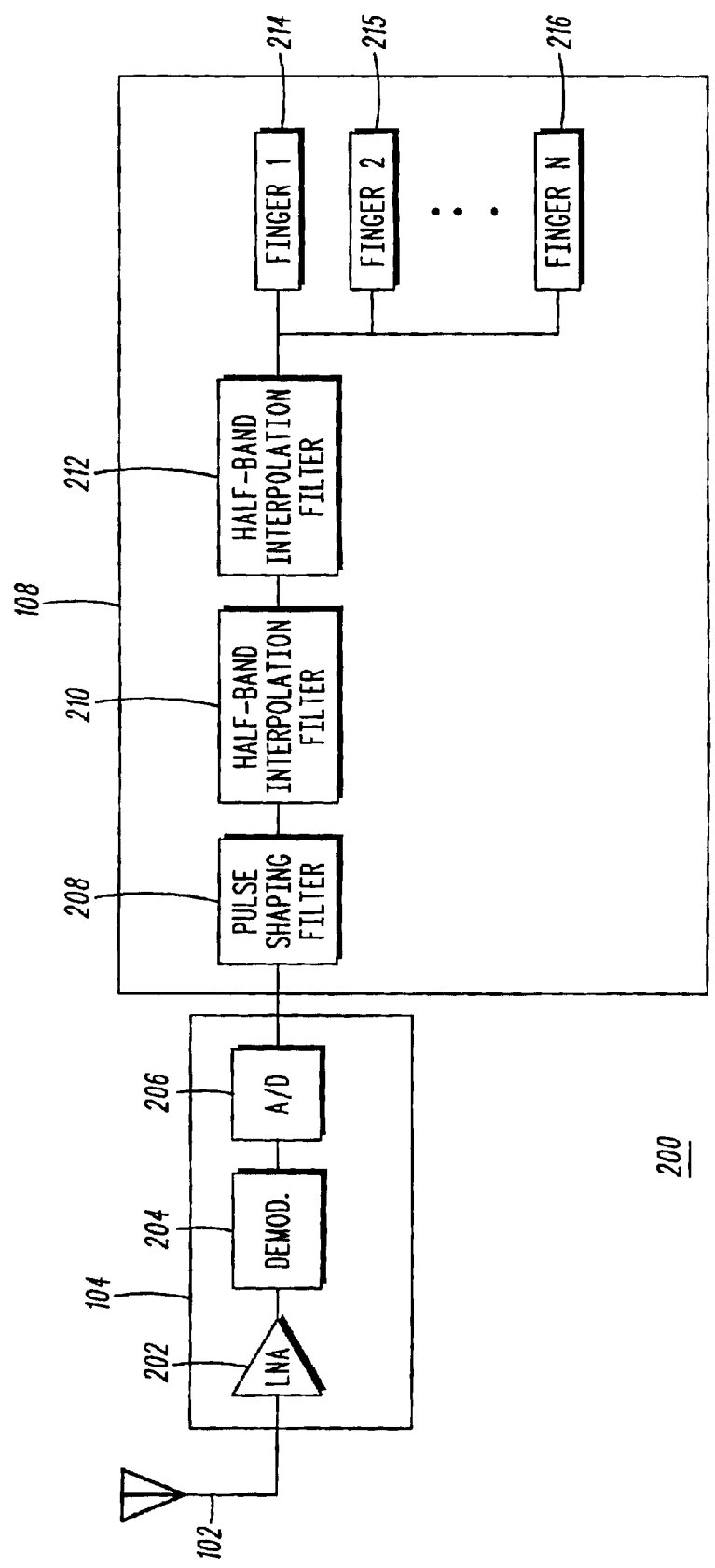
FIG. 2 is a block diagram of a received signal path of the communication device of FIG. 1 in accordance with an embodiment of the present invention.

FIG. 2 is a block diagram of a received signal path 200 of communication device 100 in accordance with an embodiment of the present invention. Received signal path 200 includes receiver unit 104 and signal processing unit 108. Receiver unit 104 receives a signal from a transmitting communication device via antenna 102. The received signal includes a pilot signal, such as a sequence of one or more bits, that communication device 100 can use to synchronize with the transmitting communication device.

Receiver unit 104 includes a low noise amplifier (LNA) 202, a demodulator 204 coupled to LNA 202, and an analog-to-digital converter (A/D) 206 coupled to demodulator 204. The received signal is routed to LNA 202. LNA 202 amplifies the received signal and routes the amplified signal to demodulator 204. Demodulator 204 demodulates the amplified signal to produce a baseband signal and routes the baseband signal to A/D 206. A/D 206 digitizes the baseband signal at a predetermined sampling rate, preferably two (2) times a chip rate of the received signal, to produce a digitized baseband signal that include multiple signal samples. The digitized baseband signal is then routed to signal processing unit 108.

Signal processing unit 108 includes a first stage filter, or filtering process, and a second stage filter, or filtering process. The first stage filtering process uses predetermined filter and interpolation coefficients to process the digitized baseband signal. The second stage filtering process uses dynamically determined interpolation coefficients to process the digitized baseband signal. By dividing the processing of the digitized baseband signal into a predetermined coefficient stage and a dynamically determined coefficient stage, the receiving communication device is able to make timing adjustments in a more efficient manner, that is, at a lesser processor loading, than a communication device in which all filtering and interpolation coefficients are dynamically determined.

The first stage filtering process preferably includes a pulse-shaping filter 208 coupled to multiple cascaded half-band polyphase interpolation filters 210, 212. Signal processing unit 108 routes the digitized baseband signal received from receiver unit 104 to pulse-shaping filter 208. Pulse-shaping filter 208 is a multiple tap finite impulse response (FIR) filter that filters the digitized baseband signal to match the transmitted filter spectrum and to reduce interchip interference by approximating a Nyquist pulse. In one embodiment of the present invention, filter 208 is run at two times the chip rate and is implemented by a use of L, preferably 64, filter taps and a corresponding L (i.e., 64) predetermined filter tap coefficients. However, those who are of ordinary skill in the art realize that other numbers of taps may be used for implementing pulse-shaping filter 208 without departing from the spirit and scope of the present invention. Pulse-shaping filter 208 filters the digitized baseband signal to produce a filtered digitized signal.

The filtered digitized signal is then routed to the multiple, preferably two, cascaded half-band polyphase interpolation filters 210, 212. Interpolation filters 210, 212 interpolate the filtered digitized signal received from filter 208 to produce a stream of signal samples at a desired sampling rate with minimal distortion of a frequency spectrum of the signal. The desired sampling rate is the chip rate for which each component signal processing unit 214–216 of receiver unit 104 is designed and is typically eight times the chip rate; however, those of ordinary skill in the art realize that other desired sampling rates may be used herein without departing from the spirit and scope of the present invention.

The operation and implementation of half-band polyphase interpolation filters is well known in the art and will not be described in detail herein. Each half-band polyphase interpolation filter 210, 212 calculates an interpolant, or sample point, that is at a mid-point between each pair of consecutive sample points input into the filter, thereby doubling the sampling rate of the input signal. Each interpolation filter 210, 212 is implemented using P filter taps and a corresponding P predetermined filter tap coefficients. Preferably P=11, which allows for an implementation of a half-band interpolation filter 210, 212 that provides less than 0.02 decibels (dB) ripple in the desired signal passband and greater than 45 dB attenuation in the stopband. However, those who are of ordinary skill in the art realize that a different number of taps may be used herein depending upon the filter parameters set by a designer of receiver 104.

A first half-band interpolation filter 210 of the multiple half-band interpolation filters 210, 212 calculates a first interpolant between each pair of consecutive sample points output by pulse-shaping filter 208 to produce an interpolated signal at four times the chip rate, that is, an interpolated signal with four samples/interpolants per chip (a '4x-interpolated signal'). The 4x-interpolated signal is then routed to a second half-band interpolation filter 212 of the multiple half-band interpolation filters 210, 212. Second half-band interpolation filter 212 calculates a second interpolant between each sample point output by pulse-shaping filter 208 and an adjacent interpolant calculated by first interpolation filter 210 to produce an interpolated signal at eight times the chip rate, that is, with eight samples/interpolants per chip (an '8x-interpolated signal') (each sample constituting a ⅛ chip sample). The 8x-interpolated signal is then routed to one of the multiple component signal processing units 214–216 of signal processing unit 108.

In another embodiment of the present invention, additional half-band interpolation filters may be cascaded in receiver 104 in order to further refine the interpolation process by providing additional interpolants between the sample points. In yet another embodiment of the present invention, one of the two half-band interpolation filters 210, 212 may be eliminated from received signal path 200 by running A/D 206 at four times the chip rate. The one remaining half-band interpolation filter then produces an interpolated signal at eight times the chip rate. However, an increase in the speed of A/D 206 imposes a need to increase the number of taps used to implement pulse-shaping filter 208 in order to obtain a desired frequency response.

An output of the cascaded half-band interpolation filters 210, 212 is coupled to an input of each of multiple parallel component signal processing units 214–216, such as Rake fingers in a Rake receiver (three shown). When communication device 100 is operating in a multipath fading environment, each component signal of the multiple path component signals received by communication device 100 is routed to a different component signal processing unit of the multiple component signal processing units 214–216. As those of ordinary skill in the art are aware, the various functions of signal processing unit 108 as described herein may be implemented by software that is stored in memory 110 and executed by a processor, such as a microprocessor or a digital signal processor (DSP). Alternatively, as those skilled in the art are further aware, the functions of one or more of blocks 208–216 may be implemented in hardware circuitry, such as a programmable logic array (PLA) or an application specific integrated circuit (ASIC).

Figure 3:
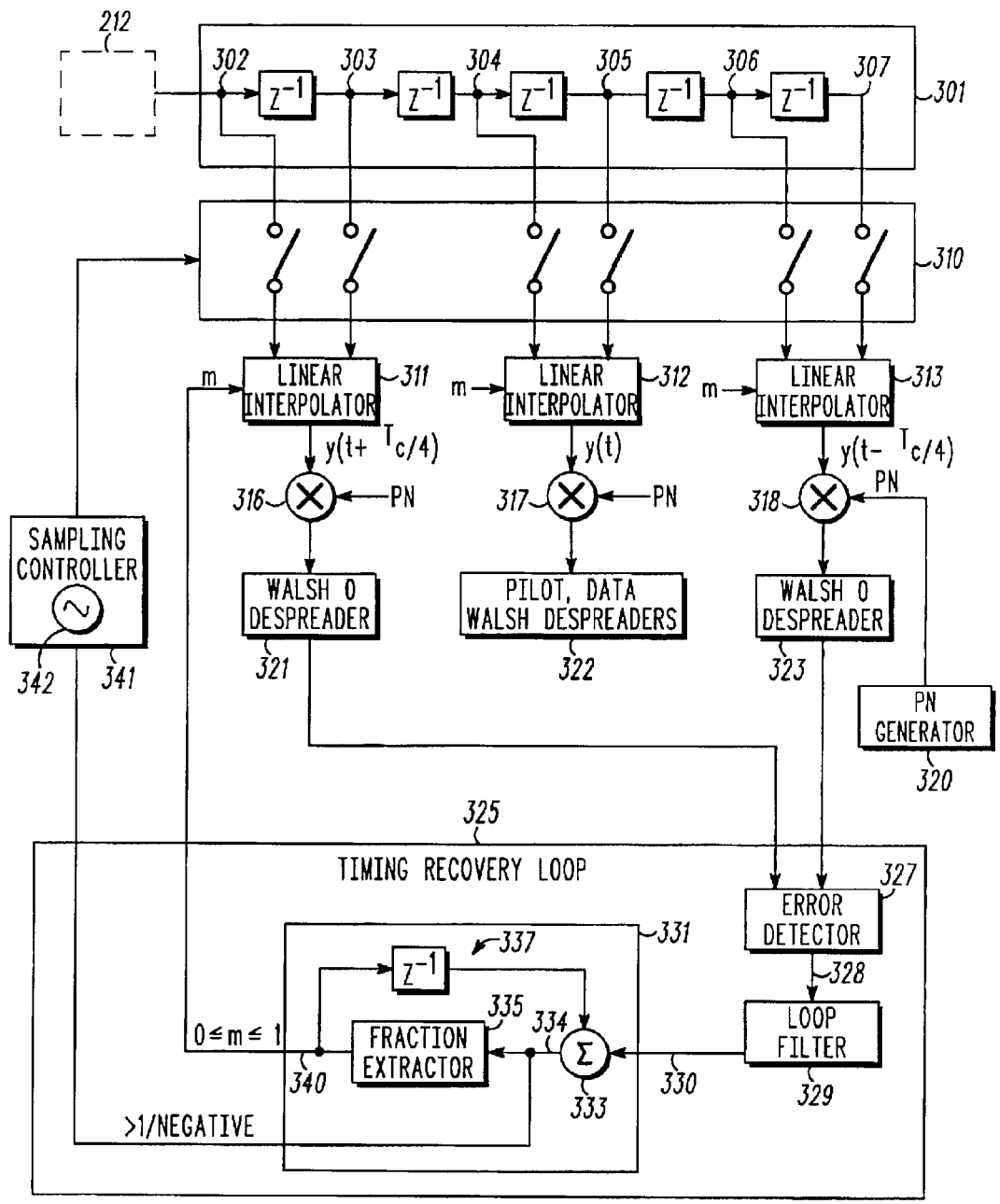
FIG. 3 is a block diagram of a component signal processing unit of the communication device of FIG. 1 in accordance with an embodiment of the present invention.

Each component signal processing unit 214–216 performs a second stage filtering process by use of multiple second stage filters that each employs at least one dynamically determined filter coefficient. FIG. 3 is a block diagram of a component signal processing unit 214–216 in accordance with an embodiment of the present invention. As depicted in FIG. 3, each component signal processing unit 214–216 includes a tapped delay line 301 having multiple delay blocks and multiple taps 302-307. Each component signal processing unit 214–216 further includes multiple second stage filters 311–313, preferably linear interpolators. Each of the multiple linear interpolators 311–313 is coupled to two consecutive taps of the multiple taps 302–307 via a sampler 310. During every sampling period $T_s$, sampler 310 samples the interpolated signal received by the component signal processing unit and provides samples of the signal to each of the multiple linear interpolators 311–313. Preferably, sampling period $T_s$ is one chip, that is, sampling rate $1/T_s$ is a 1×chip rate, and ideally is the same as the chip rate employed by the transmitting communication device.

A sampling controller 341 coupled to sampler 310 controls the sampling period of the sampler. Sampling controller 341 includes, or is connected to, a timing reference 342, such as a local oscillator circuit or a crystal clock, that provides a reference signal to the controller. Based on the reference signal and a timing adjustment signal received from a timing recovery loop 325, sampling controller 341 provides a control signal to sampler 310 that controls the sampling process performed by the sampler.

In each sampling period $T_s$, each linear interpolator of the multiple linear interpolators 311–313 receives two consecutive ⅛ chip samples, denominated herein as samples '$x_n$' and '$x_{n-1}$', from two consecutive taps in delay line 301. For example, linear interpolator 311 receives a sample '$x_n$' from tap 302 and a sample '$x_{n-1}$' from tap 303, linear interpolator 312 receives a sample '$x_n$' from tap 304 and a sample '$x_{n-1}$' from tap 305, and linear interpolator 313 receives a sample $x_n$ from tap 306 and a sample '$x_{n-1}$' from tap 307. Each linear interpolator 311–313 further receives an interpolation coefficient 'm' from timing recovery loop 325, which coefficient is dynamically determined as described in greater detail below. For each pair of ⅛ chip samples input into each linear interpolator 311–313, the interpolator calculates an interpolant, '$y_n$', based on the two input samples and the fractional sampling time 'm':

$$y_n = m x_n + (1-m) x_{n-1}.$$

As a result, during each sampling period $T_s$, linear interpolator 311 produces a interpolated value that is approximately ¼ chip later in time (i.e., $y_n(t+T_c/4)$), and linear interpolator 313 produces a interpolated value that is approximately ¼ chip earlier in time (i.e., $y_n(t-T_c/4)$), than the interpolated value produced by linear interpolator 312 (i.e., $y_n(t)$). Optimally, the samples received by linear interpolator 312 from sampler 310 are sampled at an optimal sampling point of each received chip. However, due to timing reference differences between communication device 100 and the transmitting communication device, or timing jitter introduced to the transmitted signal by the propagation environment, the samples received by linear interpolator 312 may be sampled at a sub-optimal sampling point and the optimal sampling point needs to be recovered.

In communication device 100, the multiple filter coefficients used by pulse-shaping filter 208 and half-band interpolation filters 210 and 212 are predetermined prior to the processing of a synchronization signal. Preferably, the predetermined coefficients are fixed values that are set prior to device activation, such as being programmed into communication device 100 in the factory. As opposed to the predetermined coefficients, the interpolation coefficient 'm' (or coefficients 'm' and '1−m') that is used by each linear interpolator 311–313 is a dynamically adjusted coefficient that is re-determined and re-conveyed by timing recovery loop 325 to each linear interpolator 311–313 as often as every sampling period. Alternatively, when the timing drift is gradual or the propagation environment introduces only nominal timing jitter into the transmitted signal, then the computation and adjustment of the interpolation coefficient 'm' may be less frequent.

In the prior art, all of a received signal path's filter and interpolation coefficients are dynamically determined during processing of a received signal. In communication device 100, the quantity of dynamically determined coefficients (i.e., 'm', or 'm' and '1−m') is considerably less than the quantity of predetermined filter coefficients (i.e., the pulse-shaping filter and interpolation filter coefficients). By greatly reducing the quantity of dynamically determined coefficients, communication device 100 achieves reduced processor loading relative to the prior art, freeing up processor resources for other signal processing activities or the running of other applications.

Referring again to FIG. 3, the interpolants '$y_n$' produced by each linear interpolator 311–313 are routed to a respective correlator 316–318. Each correlator 316–318 is coupled to a spectrum spreading code generator, preferably a PN code generator, 320 capable of generating a spectrum spreading code sequence, preferably a PN code sequence. Each component signal processing unit 214–216 may include a PN generator 320 or a PN generator 320 may be externally coupled to each component signal processing unit 214–216. Each correlator 316–318 applies a spectrum spreading code sequence (i.e., a PN code sequence) received from PN generator 320, which spectrum spreading code sequence is based on the sequence employed by the transmitting communication device, to the interpolants received from a respective linear interpolator 311–313 to produce a PN despread signal.

Each of correlators 316–318 then routes the PN despread signal to a respective despreader 321–323. Each despreader 321–323 uncovers the PN despread signal received from a corresponding correlator with an orthogonal code sequence, such as a Walsh code, assigned to the receiving communication device to recover a transmitted signal.

Despreader 322 recovers a transmitted pilot signal or transmitted user information for combining with data streams produced by the other component signal processing units of communication device 100. Despreader 322 recovers a transmitted pilot signal or user information by uncovering the PN despread signal using Walsh code 0 or a Walsh code used for covering data traffic, whichever is appropriate.

Despreaders 321 and 323 each recover a synchronization signal for synchronizing the component signal processing unit with the transmitting communication device. Each despreader 321, 323 uncovers the PN despread signal received from a respective correlator 318, 318 based on an orthogonal code sequence used by the transmitting communication device to spread the synchronization signal. Preferably, the synchronization signal is a pilot signal and the despreader uses the Walsh code 0 to uncover the synchronization signal. However, those who are of ordinary skill in the art realize that any transmitted signal may be used by communication device 100 to synchronize with the transmitting communication device.

When the PN despread signals that are input into despreaders 321 and 323 are based on a non-pilot code, each despreader 321, 323 outputs a data stream that is little more than noise. When the PN despread signals input into despreaders 321 and 323 are based on a pilot code, each despreader 321, 323 outputs a uncovered signal whose energy level, or power, is correlated to a timing, or phase, alignment of the sampling rate, or period, of sampler 310 with the chip rate of the transmitting communication device. The uncovered signal produced by each despreader 321 and 323 is then routed to an error detector 327.

Error detector 327 compares the uncovered signal produced by despreader 321 (the 'late' pilot signal) to the uncovered signal produced by despreader 323 (the 'early' pilot signal) and generates a timing error based on the comparison. Preferably, error detector 327 determines an energy of the uncovered signal received from each of despreaders 321 and 323. Error detector 327 then compares the two energies and generates an error signal 328 based on the comparison.

Error signal 328 corresponds to a sampling rate, or timing reference, or phase, error of communication device 100 relative to a chip rate, or timing reference, of the transmitting communication device. In one embodiment of the present invention, error detector 327 subtracts the energy of the uncovered signal received from despreader 323 from the energy of the uncovered signal received from despreader 321. When the subtraction yields a positive value, then an optimal sampling point for sampler 310 is closer to being ¼ chip late than to being ¼ chip early relative to the current sampling point, and the sampling point of sampler 310 needs to be retarded. When the subtraction yields a negative value, then the optimal sampling point for sampler 310 is closer to being ¼ chip early than to being ¼ chip late relative to the current sampling point, and the sampling point of sampler 310 needs to be advanced. Error detector 327 then routes error signal 328 to a loop filer 329 that filters out noise in the error signal.

When the current sampling rate '1/$T_s$' is correct, that is, is approximately the same as the chip rate of the transmitting communication device, but is offset in time from the optimal sampling point, then the timing error, and concomitantly error signal 328, should be approximately constant. However, when the current sampling rate '1/$T_s$' is incorrect, that is, when the sampling period '$T_s$' differs in periodicity from a ⅛ chip rate of the transmitting communication device, then error signal 328 will constantly drift, or ramp. In order to accurately track an error signal ramp, a second order timing recovery loop 325 is preferred. However, in another embodiment of the present invention, wherein timing corrections are made less frequently or timing errors of ¹⁄₁₆ chip or more are acceptable to system performance, a first order loop filter may be used.

Figure 4:
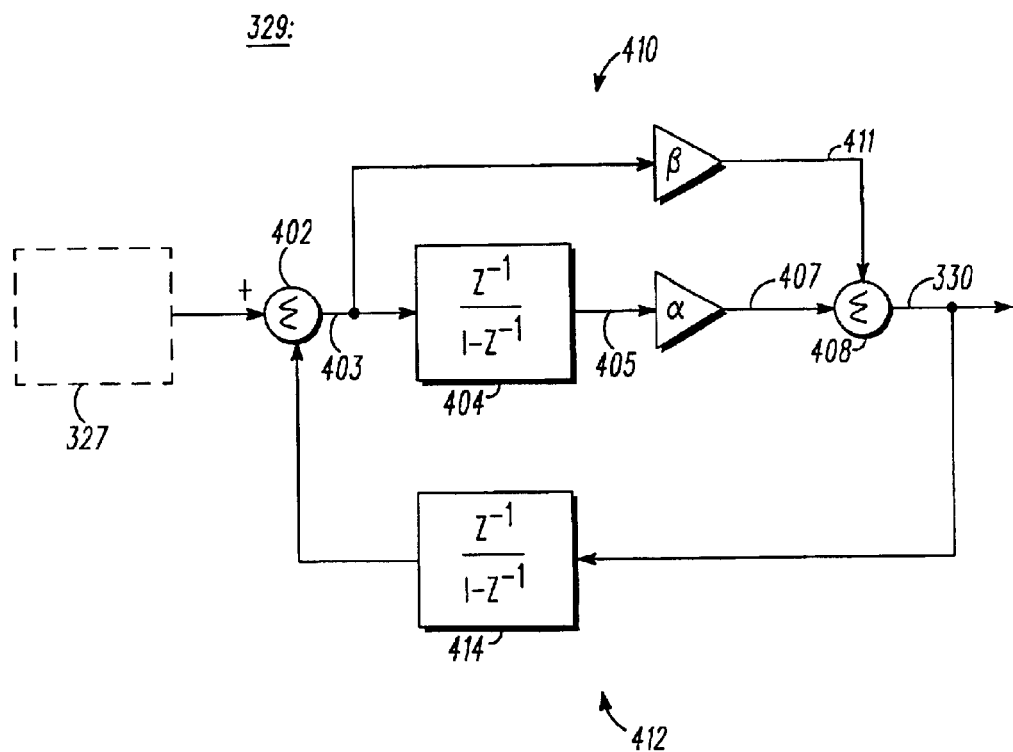
FIG. 4 is a block diagram of a loop filter of the communication device of FIG. 1 in accordance with an embodiment of the present invention.

FIG. 4 is a block diagram of loop filter 329 in accordance with an embodiment of the present invention. Error signal 328 is routed to a first summing junction 402, where the error signal is combined with the output of a negative feedback loop 412. Feedback loop 412 feeds back a sample of a loop filter output signal 330 to first summing junction 402 via a feedback loop filter 414, which filter applies a transfer function '$z^{-1}/(1-z^{-1})$' to the sampled signal. At summing junction 402, the fed back signal is negatively combined with error signal 328 to produce output signal 403.

Summing junction 402 conveys signal 403 to each of a forward path filter 404 and a feedforward loop 410. Forward path filter 404 applies a transfer function '$z^{-1}/(1-z^{-1})$' to signal 403 to produce signal 405. Signal 405 is amplified by a gain factor α to produce a signal 407 that is conveyed to a second summing junction 408. Feedforward loop 410 applies a gain factor β to the signal received from summing junction 402 to produce a signal 411 that is also conveyed to second summing junction 408. Second summing junction 408 combines signals 407 and 411 to produce an output signal 330. Loop filter 329 then routes output signal 330 to a fraction extractor circuit 331.

The factors α and β are fixed in value and are selected by the designer of loop filter 328. For example, one set of values that provides for rapid timing recovery and resolution of timing errors without excessive oscillations is α=0.42 and β=0.74. However, those who are of ordinary skill in the art realize that there are a nearly unlimited number of combinations of α and β that will provide an acceptable response from timing recovery loop 325 and that any such values may be used herein so long as the poles of timing recovery loop 325 are between the values of '1' and '−1', which is required to have a stable loop. Also, although a particular embodiment of second order loop filter 329 is described herein, those who are of ordinary skill in the art realize that other second order loop filters may be used without departing from the spirit and scope of the present invention.

Fraction extractor circuit 331 includes a summing junction 333 coupled to a fraction extractor 335 and a feedback loop 337 coupled to both summing junction 333 and fraction extractor 335. Feedback loop 337 samples an output signal 340 of fraction extractor circuit 331, applies a unit delay ('$z^{-1}$') to the sampled signal, and feeds a resulting signal back to summing junction 333. Summing junction 333 combines the fed back signal with output signal 330 of loop filter 329 to produce a timing adjustment signal 334. Timing adjustment signal 334 is then conveyed to each of fraction extractor 335 and sampling controller 341.

Sampling controller 341 determines whether the value of timing adjustment signal 334 is greater than one (>1) or negative and adjusts the sampling period, $T_s$, of sampler 310 in accordance with the determination. A value of signal 334 that is greater than one (>1) indicates that sampler 310 is sampling each chip too early and sampling controller 341 retards the sampling period by ⅛ chip. When a timing retard is triggered, the chip-rate sampling point of sampler 310 is retarded by lengthening a sample timing of sampler 310 by ⅛ chip, or to ⁹⁄₈ chip, once and then reverting to sampling intervals of 1 chip. A negative value of signal 334 indicates that sampler 310 is sampling each chip too late and sampling controller 341 advances the sampling period of sampler 310 by ⅛ chip. When a timing advance is triggered, a chip-rate sampling point of sampler 310 is advanced ⅛ chip by shortening the sampling timing to ⅞ chip once and then reverting to sampling intervals of 1 chip. By dynamically adjusting the sampling period of sampler 310 based on a comparison of preceding samples of sampler 310, each component signal processing unit 214–216 is able to track the chip rate and timing reference of the transmitting communication device and to adjust from a sub-optimal sampling point to an optimal sampling point of the received signal.

Fraction extractor 335 extracts a fraction part, 'm', from a value of timing adjustment signal 334 and conveys the extracted fraction part to each of linear interpolators 311–313. As described in detail above, each linear interpolator 311–313 receives two ⅛ chip samples, along with a fractional sampling time 'm', as inputs and determines an interpolant $y_n$ that is based on the samples and 'm'. By dynamically adjusting 'm', each linear interpolator 311 and 313 is able to dynamically adjust to time reference offsets and interpolator 312 is able to interpolate to an optimal sampling point for the data stream received by communication device 100.

By determining a timing adjustment signal that is based on samples of a received signal, each component signal processing unit 214–216 of communication device 100 is able to dynamically adjust its sampling rate to track the chip rate, or timing reference, of a transmitting communication device. Furthermore, by dynamically adjusting an interpolation coefficient 'm', each component signal processing unit 214–216 is able interpolate to an optimal sampling point of the received signal. By providing a first stage filtering and interpolation process that includes predetermined coefficients, and a second stage interpolation process that includes a minimal number of dynamically determined coefficients, each component signal processing unit 214–216 is able to make timing adjustments in a more efficient manner, that is, at a lesser processor loading, than the prior art. And by including a second order timing recovery loop, each component signal processing unit 214–216 is able to track drifting of a timing reference differential between communication device 100 and a transmitting communication device and to quickly and precisely respond to the differential.

Figure 5:
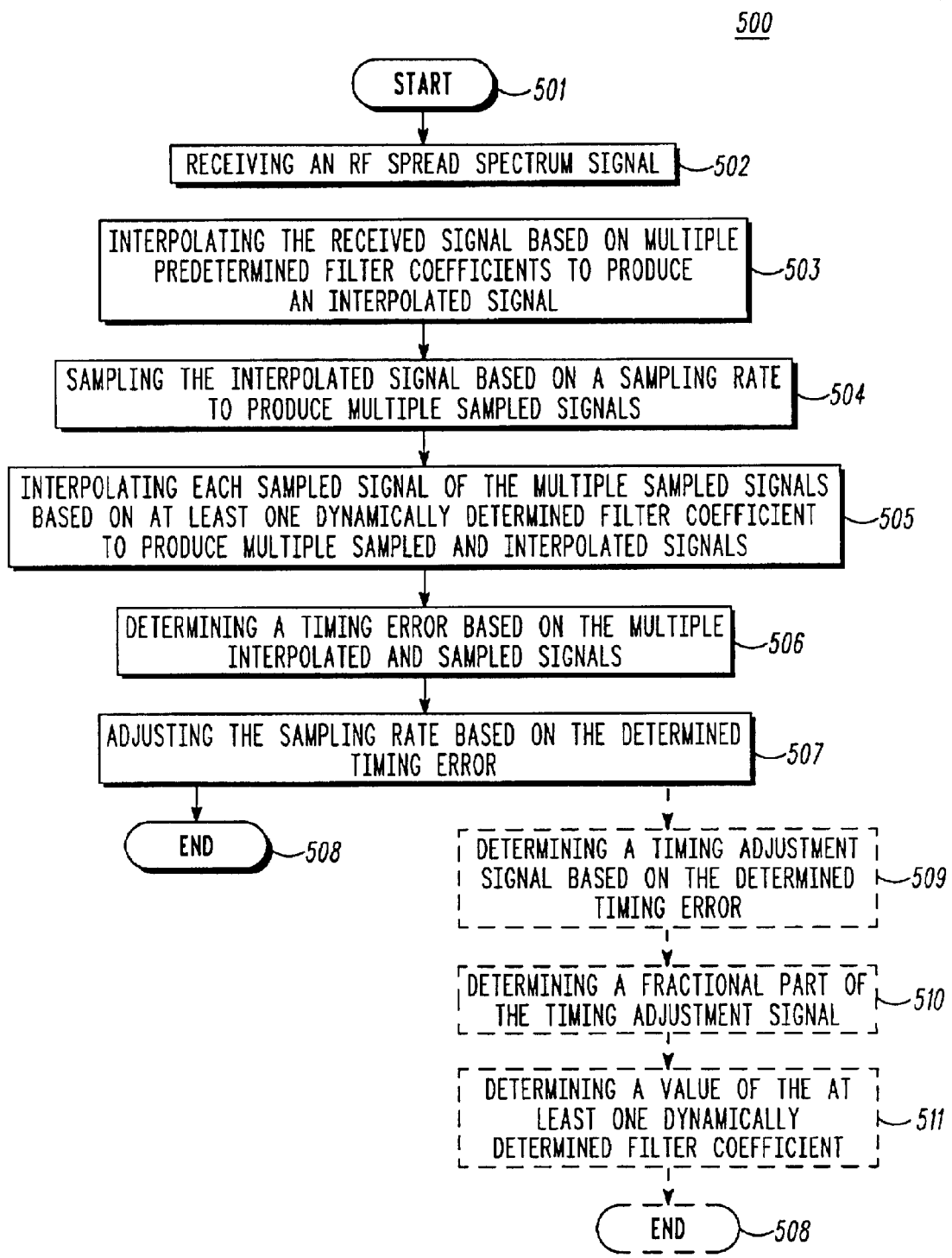
FIG. 5 is a logic flow diagram of steps executed by a communication device to receive data in accordance with an embodiment of the present invention.

FIG. 5 is a logic flow diagram 500 of steps executed by a communication device in order to receive a spread spectrum signal in accordance with an embodiment of the present invention. The logic flow starts (501) when the communication device receives (502) an RF spread spectrum signal. The communication device demodulates the received signal to produce a baseband signal and digitizes the baseband signal to produce a digitized baseband signal. The communication device, preferably an interpolation filter included in the communication device, then interpolates (503) the digitized baseband signal based on multiple predetermined filter coefficients to produce an interpolated signal. The communication device, preferably a sampler, samples (504) the interpolated signal based on a sampling rate to produce multiple sampled signals.

In one embodiment of the present invention, the communication device includes a pulse-shaping filter coupled to a first interpolation filter. The pulse-shaping filter filters the received signal based on a set of predetermined pulse-shaping filter coefficients to produce a filtered signal. The filtered signal is then conveyed to a first interpolation filter that interpolates the filtered signal based on a first set of predetermined interpolation filter coefficients to produce a first interpolated signal. The first interpolated signal is then sampled (504) based on a sampling rate to produce multiple sampled signals. In another embodiment of the present invention, the communication device further includes a second interpolation filter cascaded with the first interpolation filter. The second interpolation filter receives the first interpolated signal and further interpolates the first interpolated signal based on a first set of predetermined interpolation filter coefficients to produce a second interpolated signal. The second interpolated signal is then sampled (504) based on a sampling rate to produce multiple sampled signals.

Each sampled signal of the multiple sampled signals is conveyed to a respective linear interpolator of multiple linear interpolators included in the communication device. Each linear interpolator of multiple linear interpolators interpolates (505) the sampled signal received by the linear interpolator based on at least one dynamically determined coefficient to produce a sampled and interpolated signal. Preferably, a quantity of the at least one dynamically determined coefficient is less than a quantity of the predetermined pulse-shaping and interpolation filter coefficients.

The communication device then determines (506) a timing error based on the multiple sampled and interpolated signals. In one embodiment of the present invention, the step (506) of determining a timing error based on the multiple sampled and interpolated signals includes steps of despreading each sampled and interpolated signal of the multiple sampled and interpolated signals with a spectrum spreading code sequence, such as a PN code sequence, to produce multiple despread signals, comparing at least two of the multiple despread signals to each other to produce a comparison, and determining a timing error based on the comparison. In another embodiment of the present invention, the above step of despreading each sampled and interpolated signal of the multiple sampled and interpolated signals with a spectrum spreading code sequence includes a step of despreading each sampled and interpolated signal of the multiple sampled and interpolated signals with each of a spectrum spreading code scheme, such as a PN sequence, and an orthogonal code sequence, such as a Walsh code, to produce multiple despread signals. In yet another embodiment of the present invention, the step (506) of determining a timing error based on the multiple sampled and interpolated signals may include steps of determining a timing error based on the multiple sampled and interpolated signals and producing an error signal based on the determined timing error.

The communication device then adjusts (507) the sampling rate based on the determined timing error, and the logic flow the ends (508). In one embodiment of the present invention, the step of adjusting (507) the sampling rate includes steps of determining a timing adjustment signal based on the determined timing error, preferably based on the error signal, and adjusting the sampling rate based on the timing adjustment signal. In yet another embodiment of the present invention, the step of adjusting the sampling rate based the timing adjustment signal includes steps of retarding the sampling rate when the timing adjustment signal is greater than one (>1) and advancing the sampling rate when the timing adjustment signal is negative.

In still another embodiment of the present invention, the communication device further determines (509) a timing adjustment signal based and the determined timing error, determines (510) a fractional part of the timing adjustment signal, and determines (511) a value of the least one dynamically determined coefficient based on the fractional part of the timing adjustment signal.

In sum, a receiving communication device 100 is provided that synchronizes to a timing reference of a transmitting communication device based on a determined timing error. The receiving communication device determines the timing error by processing a synchronization signal via a first stage filtering and interpolation process that includes predetermined coefficients and a second stage interpolation process that includes a minimal number of dynamically determined coefficients. By dividing the process into a predetermined coefficient stage and a dynamically determined coefficient stage, the receiving communication device is able to make timing adjustments in a more efficient manner, that is, at a lesser processor loading, than a communication device in which all filtering and interpolation coefficients are dynamically determined in addition, by including a second order timing recovery loop, the receiving communication device is able to quickly and precisely respond to drifting of a timing reference differential between itself and the transmitting communication device.

While the present invention has been particularly shown and described with reference to particular embodiments thereof, it will be understood by those skilled in the art that various changes may be made and equivalents substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. An apparatus for timing recovery in a communication device, the apparatus comprising:
    a first stage filter that filters and interpolates the received signal based on a plurality of predetermined coefficients to produce an interpolated signal;
    a sampler in communication with the first stage filter that samples the interpolated signal based on a sampling period to produce a plurality of sampled signals;
    a plurality of second stage interpolation filters, wherein each second stage interpolation filter of the plurality of second stage interpolation filters is coupled to the sampler and wherein each second stage interpolation filter receives a sampled signal of the plurality of sampled signals and interpolates the sampled signal based on at least one dynamically determined interpolation coefficient to produce a sampled and interpolated signal;
    a spectrum spreading code sequence generator that generates a spectrum spreading code sequence;
    a plurality of correlators, wherein each correlator of the plurality of correlators is coupled to the sequence generator and to a second stage interpolation filter of the plurality of second stage interpolation filters, and wherein each correlator receives a sampled and interpolated signal from a corresponding second stage interpolation filter, receives the spectrum spreading code sequence from the sequence generator, and applies the spectrum spreading code sequence to the sampled and interpolated signal to produce a despread signal;
    a timing recovery loop in communication with the sampler and with each correlator of the plurality of correlators that receives a despread signal from each correlator and determines a timing error based on the received despread signals; and
    wherein the sampler adjusts the sampling period based on the determined timing error.

2. The apparatus of claim 1, further comprising:
    a plurality of despreaders, wherein each despreader of the plurality of despreaders is interposed between a correlator of the plurality of correlators and the timing recovery loop, and wherein each despreader receives a despread signal from a corresponding correlator and wherein each despreader uncovers the despread signal with an orthogonal code to produce an uncovered signal; and
    wherein the timing recovery loop receives an uncovered signal from each despreader and determines a timing error based on the received uncovered signals.

3. The apparatus of claim 1, wherein a quantity of predetermined coefficients is greater than a quantity of dynamically determined coefficients.

4. The apparatus of claim 1, wherein the first stage filter comprises a pulse-shaping filter coupled to a half-band interpolation filter.

5. The apparatus of claim 4, wherein the half-band interpolation filter comprises a first half-band interpolation filter and wherein the half-band interpolation filter further comprises a second half-band interpolation filter cascaded with the first half-band interpolation filter.

6. The apparatus of claim 1, wherein each interpolation filter of the plurality of interpolation filters comprises a linear interpolator.

7. The apparatus of claim 1, further comprising a controller interposed between the timing recovery loop and the sampler, which controller conveys a control signal to the sampler that is based on the determined timing error.

8. The apparatus of claim 7, wherein the timing recovery loop further determines a timing adjustment signal based on the determined timing error and wherein the controller retards the sampling period when a value of the timing adjustment signal is greater than one (>1) and advances the sampling period when a value of the timing adjustment signal is negative.

9. The apparatus of claim 1, wherein the timing recovery loop comprises a second order transfer function.

10. The apparatus of claim 1, wherein the timing recovery loop comprises:
    an error detector that determines a timing error in the sampling period and produces an error signal based on the determined timing error;
    a loop filter coupled to the error detector that filters the error signal; and
    a fraction extractor circuit coupled to the loop filter that determines the timing adjustment signal based on the error signal.

11. The apparatus of claim 1, wherein the timing recovery loop determines a value of the at least one dynamically determined coefficient based on the determined timing error.

12. The apparatus of claim 11, wherein the timing recovery loop comprises a fraction extractor circuit that produces the at least one dynamically determined coefficient based on the determined timing error.

13. The apparatus of claim 1, wherein each component signal processing unit comprises a Rake finger.

14. A method for timing recovery comprising steps of:
    receiving a radio frequency signal;
    interpolating the received signal based on a plurality of predetermined interpolation coefficients to produce an interpolated signal;
    sampling the interpolated signal based on a sampling rate to produce a plurality of sampled signals;
    interpolating each sampled signal of the plurality of sampled signals based on at least one dynamically determined interpolation coefficient to produce a plurality of interpolated and sampled signals;
    determining a timing error based on the plurality of interpolated and sampled signals; and
    adjusting the sampling rate based on the determined timing error.

15. The method of claim 14, wherein a quantity of predetermined filter coefficients is greater than a quantity of the at least one dynamically determined coefficient.

16. The method of claim 14, wherein the step of interpolating the received signal comprises steps of:
    interpolating the received signal based on a first plurality of predetermined filter coefficients to produce a first interpolated signal;

interpolating the first interpolated signal based on a second plurality of predetermined filter coefficients to produce a second interpolated signal; and wherein the step of sampling comprises a step of sampling the second interpolated signal based on a sampling rate to produce a plurality of sampled signals.

17. The method of claim 14, further comprising a step of despreading each interpolated signal of the plurality of interpolated signals with a spectrum spreading code sequence to produce a plurality of despread signals and wherein the step of determining a timing error comprises a step of determining a timing error based on the plurality of despread signals.

18. The method of claim 14, further comprising a step of despreading each interpolated signal of the plurality of interpolated signals with each of a spectrum spreading code sequence and a orthogonal code sequence to produce a plurality of despread signals and wherein the step of determining a timing error comprises a step of determining a timing error based on the plurality of despread signals.

19. The method of claim 18, wherein the step of determining a timing error comprises a step of determining an error signal based on the despread signals, and wherein the method further comprises steps of:

determining a timing adjustment signal based on the error signal; and adjusting the sampling rate based on whether a value of the timing adjustment signal is positive or negative.

20. The method of claim 14, further comprising a step of determining a value of the at least one dynamically determined coefficient based on the determined timing error.

21. The method of claim 20, wherein the step of determining a timing error comprises determining an error signal based on the plurality of interpolated and sampled signals, and wherein the step of determining the at least one dynamically determined coefficient comprises steps of:

determining a timing adjustment signal based on the error signal;

determining a fractional part of the timing adjustment signal; and determining the least one dynamically determined coefficient based on the fractional part of the timing adjustment signal.

22. A communication device comprising:

a receiving unit capable of receiving a spread spectrum signal, demodulating the received spread spectrum signal to produce a baseband signal, and sampling the baseband digital signal to produce a baseband digitized signal; and a signal processing unit coupled to the receiving unit and capable of interpolating the baseband digitized signal based on a plurality of predetermined coefficients to produce an interpolated signal, sampling the interpolated signal based on a sampling period to produce a plurality of sampled signals, interpolating each sampled signal of the plurality of sampled signals based on at least one dynamically determined interpolation coefficient to produce a plurality of output signals, determining a timing error based on at least two output signals of the plurality of output signals, and adjusting the sampling period based on the determined timing error.

23. The communication device of claim 22, wherein the signal processing unit further is capable despreading each output signal with a spectrum spreading code sequence to produce a plurality of despread signals, and wherein the timing error is based on the plurality of despread signals.

24. The communication device of claim 22, wherein the signal processing unit further is capable of cross-correlating each output signal with each of a spectrum spreading code sequence and an orthogonal code sequence to produce plurality of despread signals, and wherein the timing error is based on the plurality of despread signals.

25. The communication device of claim 22, wherein a value of the at least one dynamically determined coefficient is based on the determined timing error.

* * * * *

UNITED STATES PATENT AND TRADEMARK OFFICE
CERTIFICATE OF CORRECTION

PATENT NO. : 6,879,623 B2
DATED : April 12, 2005
INVENTOR(S) : Agami et al.

It is certified that error appears in the above-identified patent and that said Letters Patent is hereby corrected as shown below:

Column 15,
Lines 9 and 16, after "interpolated", insert -- and sampled --.
Line 35, after "determining", insert -- a value of --.

Signed and Sealed this

Sixteenth Day of August, 2005

JON W. DUDAS
*Director of the United States Patent and Trademark Office*